United States Patent [19]

Catron et al.

[11] Patent Number: 5,033,079
[45] Date of Patent: Jul. 16, 1991

[54] ESTABLISHMENT OF FACSIMILE CALLS

[75] Inventors: Nancy A. Catron, Long Valley; Joseph V. Fodale, Lincroft; Karrie J. Hanson, Westfield; Robert A. Koch, Freehold; Ronald E. Large, Holmdel; Susan M. Zoccolillo, Howell, all of N.J.

[73] Assignee: AT&T Bell Laboratories, Murray Hill, N.J.

[21] Appl. No.: 399,384

[22] Filed: Aug. 24, 1989

Related U.S. Application Data

[63] Continuation-in-part of Ser. No. 358,743, May 30, 1989, abandoned.

[51] Int. Cl.$^5$ .......................................... H04M 11/00
[52] U.S. Cl. ........................................ 379/100; 379/94
[58] Field of Search ........................ 379/100, 93, 94; 358/440

[56] References Cited

U.S. PATENT DOCUMENTS

| | | | |
|---|---|---|---|
| 3,728,486 | 4/1973 | Kraus | 379/69 |
| 4,221,933 | 9/1980 | Cornell et al. | 379/84 |
| 4,277,649 | 7/1981 | Sheinbein | 379/197 |
| 4,922,348 | 5/1990 | Gillon et al. | 358/434 |
| 4,924,495 | 5/1990 | Richards et al. | 379/229 |
| 4,932,042 | 6/1990 | Baral et al. | 379/100 |

OTHER PUBLICATIONS

"Telematic Services: Operations and Quality of Service", *CCITT Red Book*, vol. II-Fascicle II.5, Recommendations F.160-F.350, VIIIth Plenary Assembly, Malaga-Torremolinos, Oct. 8-19, 1984.
C. A. Dahlbom et al., "History and Description of a New Signaling System", *The Bell System Technical Journal*, vol. 57, No. 2., Feb. 1978, pp. 225-250.
S. Addicks et al., "Common Channel Signaling: Keystone of the Intelligent Network", *Globecom* '86, Conference Record vol. 3 of 3, Houston, Texas, Dec. 1-4, 1986, pp. 50.1.1-50.1.6.
M. C. Griffith et al., "800 Service Central Office Implementation", *Globecom* '86, Conference Record vol. 3 of 3, Houston, Texas, Dec. 1-4, 1986, pp. 50.2.1-50.2.7.
R. A. McGowan, "Common Channel Signaling Gets Services to the Customers", *Globecom* '86, Conference Record vol. 3 of 3, Houston, Texas, Dec. 1-4, 1986, pp. 50.3.1-50.3.3.
R. R. Goldberg, "Generic Requirements for Services in the Common Channel Signaling Network", *Globecom* '86, Conference Record vol. 3 of 3, Houston, Texas, Dec. 1-4, 1986, pp. 50.4.1-50.4.3.
D. J. Marutiak, "AT&T Common Channel Signaling Services and Products", *Globecom* '86, Conference Record vol. 3 of 3, Houston, Texas, Dec. 1-4, 1986, pp. 50.5.1-50.5.6.
L. Y. Ong, "Protocol Interworking for ISDN Services", *Globecom* '86, Conference Record vol. 3 of 3, Houston, Texas, Dec. 1-4, 1986, pp. 50.6.1-50.6.5.

*Primary Examiner*—Jin F. Ng
*Assistant Examiner*—Stella L. Woo
*Attorney, Agent, or Firm*—W. Ulrich

[57] ABSTRACT

This invention relates to methods of establishing facsimile (fax) connections. If a call is originated from a fax source and the destination is a voice station, then the call will be automatically redirected to a fax machine designated to receive fax messages for the voice station. A fax call is detected by a class of service indication in a local switching office, or by having a number forwarded to a toll office from a local office by Automatic Number Identification (ANI) of the caller that is one of a list of fax numbers. When it is determined that a call is a fax call, a fax indicator is sent with Common Channel Signaling (CCS) messages for that call. If a call with a fax indicator is received in a destination switching office, then the destination office checks to see if the called number is a fax number; if not, translation is made to find the number of a fax station for serving fax calls to the called number, and the call is completed to that fax station. Advantageously, customers need not know a fax number to transmit a fax message to an intended recipient.

32 Claims, 3 Drawing Sheets

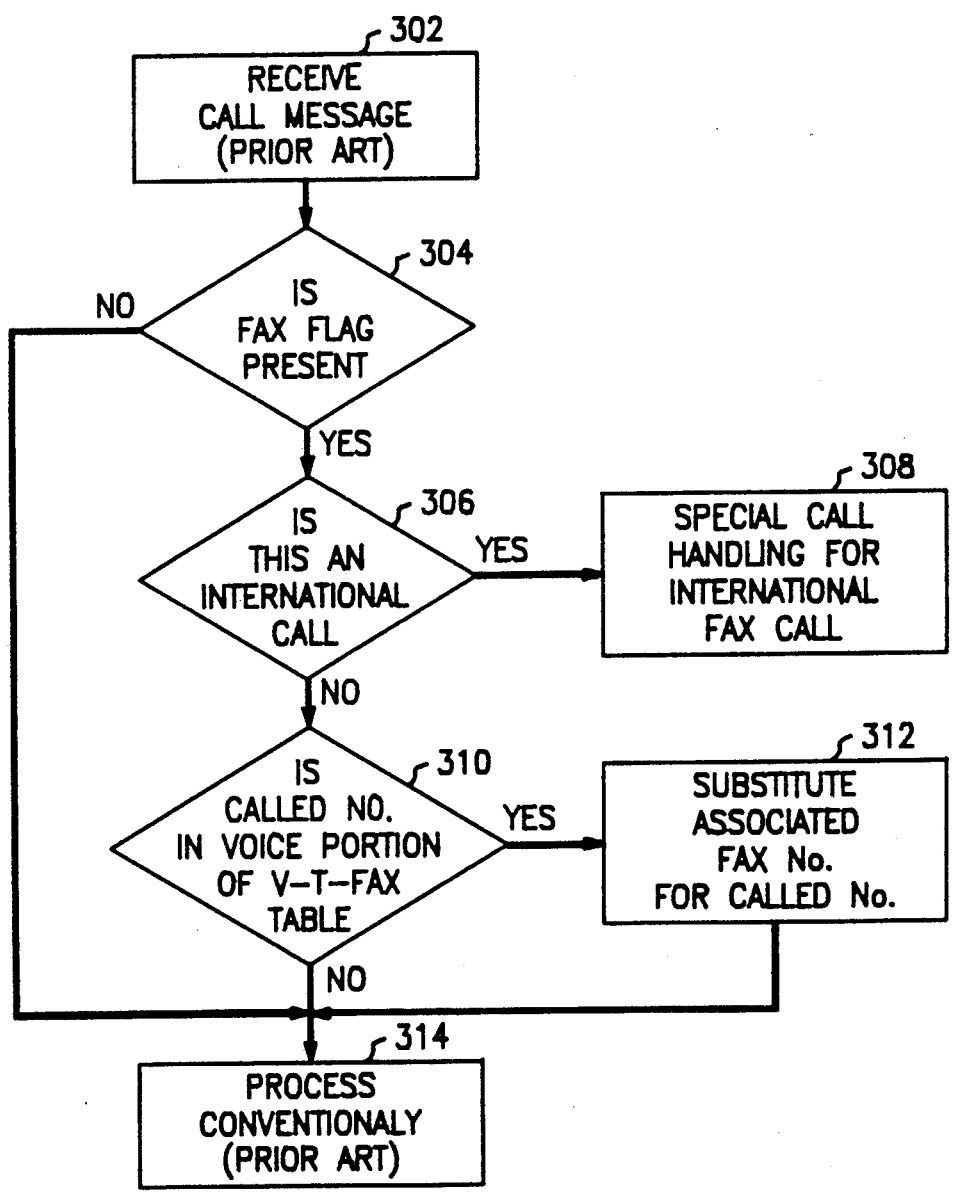

ESTABLISHMENT OF FACSIMILE CALLS

This application is a continuation-in-part of application Ser. No. 358,743, filed on May 30, 1989, now abandoned.

Technical Field

This invention relates to facsimile service and other specialized types of telecommunications calls.

PROBLEM

Facsimile service is becoming increasingly popular because of the wide availability of relatively inexpensive facsimile machines. Facsimile (fax) service however still presents some problems. One common problem is attempting to send a facsimile message to a customer whose telephone number is known but whose facsimile number is not known. Under these circumstances, a separate call is typically required to identify the customer's facsimile number. This is wasteful of the calling and called customer time and is also expensive since an extra call is required.

International facsimile calls customarily use selected circuits with low distortion since conventional facsimile signals may be excessively distorted over many other international voice transmission facilities. Getting access to such selected circuits presents a problem.

Advances in fax service now enables a customer encountering a busy on a fax call to send a facsimile message to a store and forward facility for subsequent transmission to the destination facsimile machine when that facsimile machine is available. However, such service reorigination involves a time consuming process in order to call a store and forward facility and to redial the called number into that facility for subsequent fax delivery. In view of the foregoing, needs exist in the art to process fax calls to a fax machine without the caller dialing the fax number, to process international fax calls over special low distortion circuits, and to eliminate the time consuming store and forward processes. Similar needs are encountered in other types of specialized telecommunication calls such as calls to a recipient voice messaging system and electronic mail system.

SOLUTION

The foregoing needs are met and an advance is made over the prior art in accordance with the principles of this invention wherein in an illustrative embodiment, facsimile calls are processed to a fax destination by class of service marks for special treatment in their processing through a common carrier network. Advantageously, such a class mark permits a number of special fax features to be implemented, including automatic transfer of fax calls from the number of a called voice station to an associated fax number, automatic routing of international calls over selected facilities, and semi-automatic conversion of a conventional fax call to a store and forward call on busy.

It is a feature of this invention that a fax caller may dialup a conventional (voice) telephone station line and have that call connected automatically to a fax machine serving that station line instead of its telephone. That action is achieved by recognizing a fax traveling class mark at a destination switching office controller or processor, having that processor consult a memory to derive a fax destination number serving the called party, and then controlling a routing of the fax call to that fax destination instead of the telephone identified by the dialed number.

Another feature of the invention is that when a facsimile call is recognized, a receiver is attached to the call to detect if the calling customer dials additional digits for requesting a store and forward connection. The customer may dial such additional digits in response to hearing that the called facsimile number is busy or detecting that the called facsimile number does not answer. In either case, when the additional digits are detected, the call is routed to a store and forward facsimile facility and the previously dialed called number and the originating customer's number are automatically forwarded to that store and forward facility for delivery of the call, delivery of a confirmation, and for billing.

On international fax calls, the invention provides facilities in an international gateway switch to ascertain that the call is a facsimile call and automatically to route the call over selected low distortion transmission facilities for quality communication.

It is a feature of the invention that facsimile calls are identified in a local switch from either the line equipment appearance number of the calling line or the directory number of the calling customer, and in an interexchange carrier switch on the basis of the calling customer directory number as forwarded through automatic number identification facilities. In the latter embodiment, a memory table maintained in an interexchange carrier (IXC) egress switch translates a called voice station number into a destination facsimile number to provide data so that call completion to a facsimile line is automatically effected.

In this embodiment some lines, such as those connecting a private branch exchange (PBX) to a switching office, may carry either facsimile or other traffic. Customers on those lines are asked to key a signal, either * or #, to identify whether a particular call is fax. More generally, a large number of calls, consisting of several broad classes of specialized calls, can be handled advantageously by permitting a routing to a destination other than the nominal destination based upon the class of the call. Examples of classes of calls are facsimile calls, calls directly to the voice messaging system serving the intended recipient, and calls to the electronic mail system serving the recipient. The class of the call can be established automatically in the local switch from either the line equipment appearance number of the calling line or the directory number of the calling customer (and communicated from a local switch to an IXC switch via information digits), and in an IXC switch on the basis of the calling customer directory number as forwarded through automatic number identification facilities or through additional digits collected from the originator of a call in response to a network provided prompt.

Accordingly this invention is an arrangement for recognizing fax calls, and responsive to such recognition, to automatically transfer a fax call to a voice destination to the fax machine associated with that voice destination. A fax call indicator, such as a traveling class mark in CCS messages for the call, is used to communicate that the call is a fax call to switching offices for that call.

BRIEF DESCRIPTION OF THE DRAWING

FIGS. 2 and 3 are flow charts of programs for controlling actions required to implement applicants' invention in an interexchange carrier ingress and egress switch, respectively.

DETAILED DESCRIPTION

Figure 1:
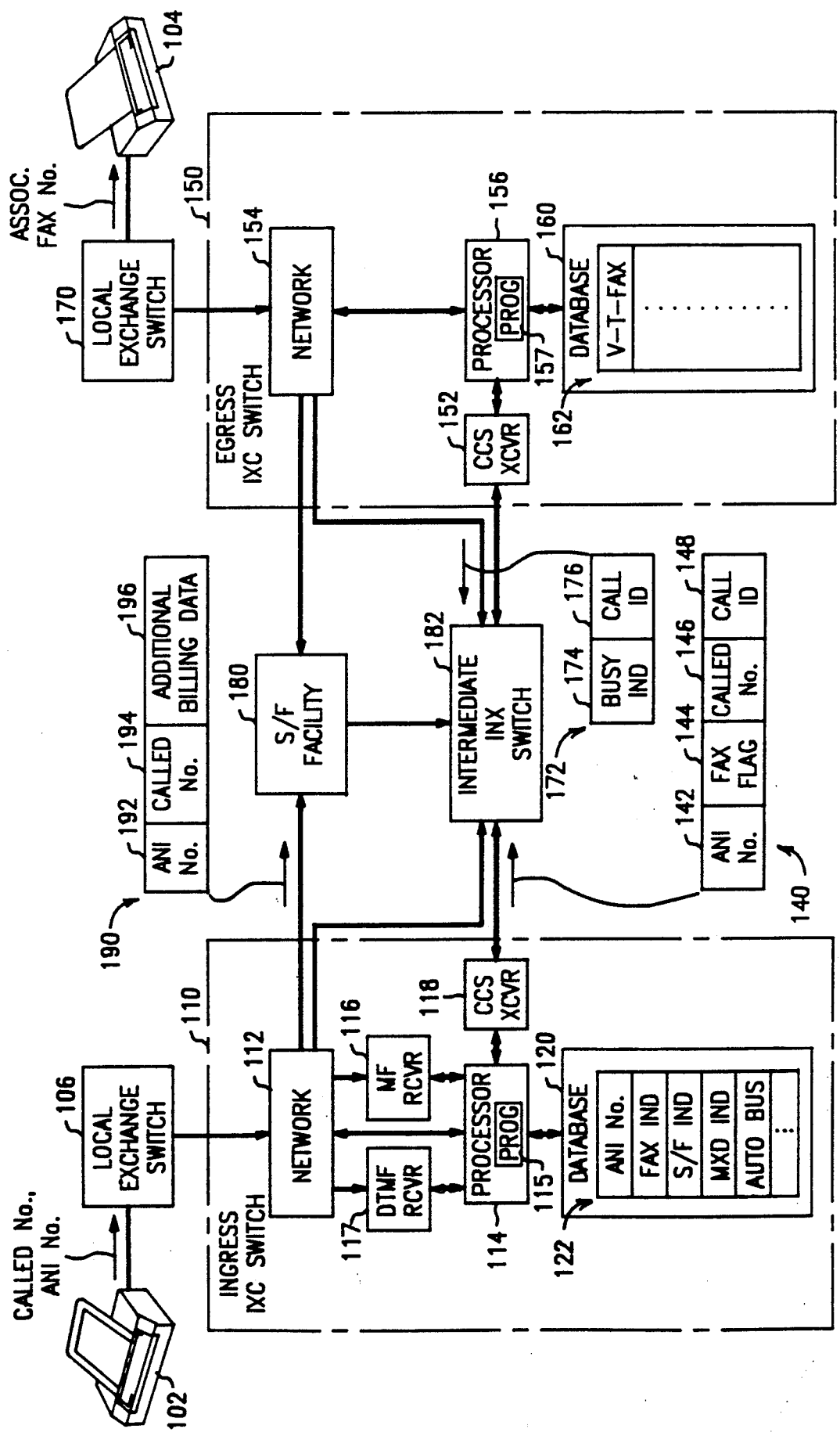
FIG. 1 is an overall block diagram of an interexchange carrier system for implementing applicants' invention.

FIG. 1 is a block diagram showing major elements required to implement applicants' invention. Two facsimile machines are shown, originating facsimile machine 102 and terminating facsimile (fax) machine 104. In accordance with the principles of this invention, each such machine is "registered" with the carriers serving the customer, and, as indicated below, data is recorded in the appropriate switches that the customer's line connected to that machine is, in fact, connected to a fax machine. Each of these machines has an associated telephone number. Originating facsimile machine 102 is connected to serving local exchange switch 106. The number of the originating facsimile machine 102 is referred to hereinafter as the calling number and is the number identified by Automatic Number Identification (ANI) at the connected local exchange carrier (LEC) switch 106.

The terminating facsimile telephone number will be referred to hereinafter as the associated facsimile number; in this example, the caller at facsimile machine 102 does not know the telephone number of facsimile machine 104 but instead knows only the voice telephone number of a customer who is served by facsimile machine 104. However, as discussed infra, the interexchange carrier network has information stored in a table to translate from that voice telephone number to the number of fax machine 104.

When originating facsimile machine 102 places a call to a called number (the number of the voice telephone of the customer to whom a facsimile message is to be sent), the called number and the number of facsimile machine 102, identified by ANI facilities in local exchange carrier switch 106 and hereinafter referred to simply as the ANI number, are sent to ingress interexchange carrier (IXC) switch 110. In this specific embodiment, the IXC switches are 4 ESS TM switches, described in *The Bell System Technical Journal*, Vol. 56, No. 7, September 1977, pages 1015–1320. Signaling between LEC switch 106 and IXC switch 110 is carried out using Feature Group D signaling which permits the signaling of ANI data. Feature Group D signaling is specified in Bellcore document: *Notes on the BOC Intra—LATA Networks*—1986, Technical Reference TR-NPL-00275, Issue 1, April 1986, Section 6. The IXC switch 110 comprises a switching network 112 for interconnecting communications ports, a processor 114 for controlling the operations of the switch, dual tone multi-frequency (DTMF) receivers 117 for receiving DTMF signals from fax machine 102, MF receivers 116 for receiving signals from local exchange carrier switch 106, a common channel signaling (CCS) transceiver 118 for transmitting messages to other IXC switches, and a data base 120 for storing, among other items, a table 122. The table 122 stores ANI numbers associated with facsimile machines served by switch 110 and, for each such facsimile machine, an indicator of whether store and forward service is offered to that machine, an indicator of mixed use service, and an indicator of automatic connection to store and forward on busy.

When an incoming call from LEC switch 106 is detected in switch 110, the call is connected through network 112 to an MF receiver 116 to receive the called number and the ANI number transmitted from switch 106. Processor 114, operative under the control of program 115, records these digits as they are received and checks in data base 120 to see if the ANI number corresponds to a facsimile machine, or whether the ANI number corresponds to a mixed use line. The treatment of mixed use lines is discussed hereinafter with reference to FIG. 2, blocks 230 and 232. In this case, the ANI number corresponds to facsimile machine 102 which, it is assumed for the purposes of this description, also has a store and forward indicator indicating that this machine has subscribed for store and forward service.

After the call has been received in switch 110, the call is routed toward an egress IXC switch which can access the LEC switch 170 which serves the called number. It is assumed in this case that the connection must go through an intermediate IXC switch 182 in order to reach egress IXC switch 150. A CCS message 140 is sent to intermediate IXC switch 182 using CCS transceiver 118 and controlled by processor 114. The message 140 comprises segment 142, containing the ANI number, segment 144 containing a fax flag indicating that this is a call originated from a fax machine, segment 146 comprises the called number, and segment 148 comprising an identifier for identifying the call.

Intermediate IXC switch 182 receives the message over CCS facility and the associated call over a transmission facility, and sets up an additional connection to egress IXC switch 150 and transmits the message 140 to that switch. Intermediate IXC switch 182 and egress IXC switch 150 are similar to ingress IXC switch 110. The call is connected to network 154 of egress IXC switch 150. The message 140 is received in CCS transceiver 152 of switch 150. Processor 156 of switch 150, operative under the control of program 157, examines message 140 and recognizes fax flag 144. Processor 156 then queries data base 160 of switch 150 to access voice to fax (V-T-FAX) translation table 162. This table translates from the called number to the associated fax number for LEC switches served by the egress IXC switch. Egress IXC switch 150 then forwards the associated fax number, not the called number, to LEC switch 170 which serves terminating fax machine 104. If fax machine 104 is available, the call is set up.

If fax machine 104 is either busy as indicated to the caller via busy message 172 sent from egress IXC 150, or if fax machine 104 does not answer, then the customer at fax machine 102 may key a group of DTMF signals for requesting a store and forward connection. Because of the requirements that enhanced services (which includes store and forward fax) must be capable of being provided by anyone, it is necessary for the customer to key information for specifying a desired store and forward carrier. For greater clarity, it is assumed in this case that the store and forward carrier is one associated with the interexchange carrier and therefore connected using switches of that interexchange carrier. For further simplicity, it is assumed that the store and forward facility 180, accessible from ingress IXC switch 110 is also connected via intermediate IXC switch 182 and egress IXC switch 150 to facsimile machine 104. If the customer hears a busy tone or recognizes that facsimile machine 104 is not answering, then the customer at facsimile machine 102 keys data for specifying use of store and forward facility 180 on this call. The connection from IXC switch 110 to fax machine 104 is removed and instead facsimile machine 102 is connected via IXC switch 110 to store and forward facility 180. Common channel signaling message 190 is sent to store and forward facility 180. This message 190 includes segments 192 comprising the ANI number, 194 comprising the called number, and optionally 196 for additional billing data. Both the ANI number and the called number have been retained in the memory of processor 114 and do not need to be redialed or retransmitted to IXC carrier switch 110. For customers who prefer an automatic connection to a store and forward facility on busy, the busy indicator 174 on CCS message 172 can be used to set up the connection to the store and forward facility automatically.

Figure 2:
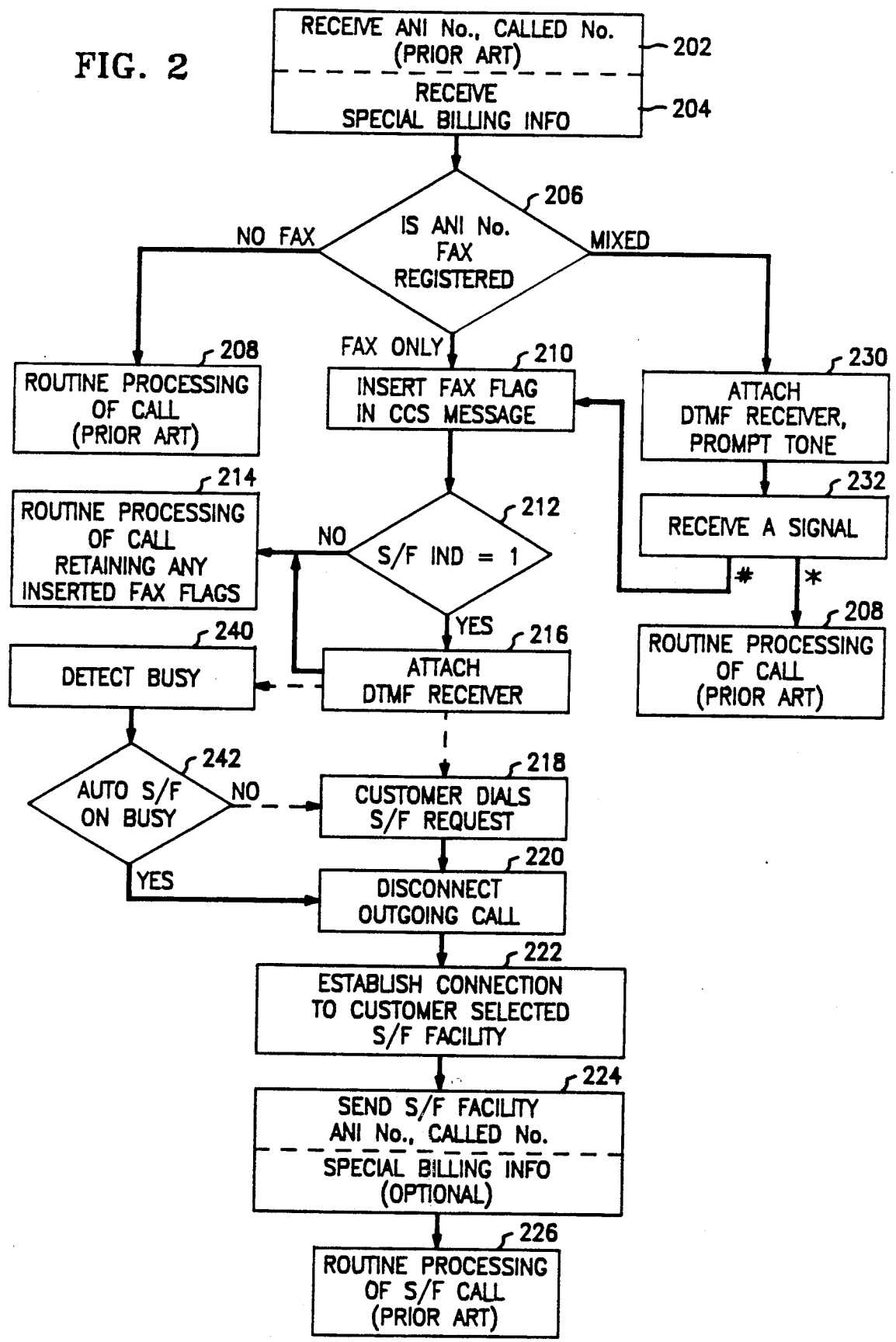

FIG. 2 is a flow chart of actions performed in the ingress switch. The ANI number and the called number for a call are received in the ingress switch (action block 202). This block is performed as in the prior art. In addition, special billing information such as a subaccount billing number may also be received along with the call (action block 204). Subaccount billing procedures are described in Bauer et al.: U.S. Pat. No. 4,776,004. Next, the ANI number is checked to see whether it is associated with a fax machine (test 206), or a mixed use line. If not, then routine call processing in accordance with the principles of the prior art is performed for that call (action block 208). If the ANI number is associated with a fax machine, then a fax flag is inserted in the CCS message to be sent to the next switch to which this call is to be routed. Next, test 212 checks whether the store and forward indicator for that ANI number is 1. If not, then the call is processed routinely from that point with the exception of the retention of the fax flag in the CCS message being generated (action block 214). If the store and forward indicator is 1, then a dual tone multifrequency (DTMF) receiver is attached to the call (action block 216) and thereafter the call is processed routinely as previously described with respect to action block 214. If subsequently dialed DTMF digits are detected, representing a store and forward request (action block 218), then the outgoing call from the ingress IXC switch is disconnected (action block 220) and a connection to the customer selected store and forward facility identified by the store and forward request dialed by the customer is established (action block 222). The ingress IXC switch then sends to the store and forward facility the ANI number, the called number, and any special billing information generated in action block 204 (action block 224). Thereafter, the call is processed as a routine facsimile store and forward call (action block 226). If the called terminal is busy, and message 172 including busy indicator 174 is detected (action block 240), then if the calling fax number has automatic store and forward on busy (positive result of test 242), the actions starting with action block 220 are performed; if the result of test 242 is negative, the system continues to wait for a customer dialed store and forward request.

If the ANI number is associated with a mixed use line, a DTMF receiver is attached and the caller is prompted to key a # for FAX use or * for non-fax use (action block 230). If a # is detected, indicating a fax call, then the actions previously described starting with action block 210 are performed. If a * is detected, indicating a non-fax call, then routine call processing as indicated in action block 208 is performed. An alternative method of recognizing that a call is a fax call is the following: Feature Group B and Feature Group D of Equal Access Signaling, as described in the Bellcore document *Notes on the BOC Intra—LATA Networks*—1986, Technical Reference TR-NPL-000275, Issue 1, April 1986, Section 6, provides for the transmission of two digits, called Information Digits ("II" digits), between network switches to classify a call. II digits have traditionally been used to identify coin phones, hotels, etc. and have been more recently used to identify services such as virtual private networks and wide-area telephone services. An II digit pair, can be used to identify a fax call. These II digits can be transmitted by a local exchange 106 to an IXC switch 110 as a method of identifying the call as a fax call. Once the call classification is communicated to the IXC network, the classification can be communicated to other switches in the IXC network via an indicator 144 in a CCS message 140. Alternatively, the II digits can be transmitted as part of the CCS message 140 and can be interpreted in IXC switch 150 to recognize a FAX call or to recognize the indication of another special service type of call.

FIG. 3 is a flow chart of actions performed in the egress IXC switch. The CCS message for an incoming call is received in action block 302 in accordance with the prior art. This message is checked to see if the facsimile flag is present (test 304). If not, then the call is processed conventionally as in the prior art (action block 314). If the facsimile flag is present in the CCS call message, test 306 is used to determine whether this is an international call. If so, then the special handling for international calls is performed (action block 308). This includes ensuring that the appropriate low distortion transmission facilities are selected for this call. If this is not an international call, then the voice-to-fax translation table is checked to see if the called number is in the "voice" portion of that table (test 310). If so, then the associated fax number is substituted for the called number (action block 312) and the call is thereafter processed conventionally. If the called number is not in the "voice" portion of the v-t-fax table, conventional call processing is carried out (action block 314).

While this description has been in terms of facsimile calls and identification of the call via ANI, arrangements can be used for other classes of specialized calls and for the identification of those classes of calls by other means. All that is needed is a means to identify the class of the call, a means of transmitting the class of the call to the destination switching office controller or processor, and a means of translating the dialed number into the appropriate number associated with the dialed number based on the class of the call.

It is to be understood that the above description is only of one preferred embodiment of the invention. Numerous other arrangements may be devised by one skilled in the art without departing from the spirit and scope of the invention. The invention is thus limited only as defined in the accompanying claims.

We claim:

1. A fax call method comprising the steps of:
   receiving, on a call from a facsimile station, a terminating number of a first destination that cannot serve facsimile traffic; and
   translating the terminating number to a code of a facsimile station for serving said first destination.

2. A fax call method comprising the steps of:
   in response to reception of a call from a facsimile station, determining whether a specified call destination is another facsimile station; and
   in response to determining that the call destination is not another facsimile station, completing the call to a facsimile destination associated with the specified call destination.

3. A method of setting up a facsimile call comprising the steps of:
recognizing that the call is from a facsimile station;
responsive to said step of recognizing, setting a facsimile indicator in a common channel signaling (CCS) message being sent to a switching system; and
processing the call as a facsimile call in the switching system.

4. The method of claim 3 wherein said recognizing comprises the step of:
performing a class of service translation in a local office to determine that a line is connected to a facsimile station.

5. The method of claim 3 wherein said recognizing comprises the steps of:
receiving an automatic number identification (ANI) number of a calling customer; and
translating said ANI number to determine whether a line associated with said ANI number is connected to a facsimile station.

6. The method of claim 3 wherein said recognizing step comprises the step of:
recognizing that the call is from a line which originates facsimile calls and other calls;
connecting a receiver to said call; and
detecting a signal identifying a facsimile call in said receiver for said call.

7. The method of claim 6 wherein said receiver is a dual tone multifrequency (DTMF) receiver, and wherein said signal is a DTMF signal keyed at a customer station.

8. The method of claim 3 wherein said processing step comprises the steps of:
detecting that said call is an international call; and
if said call is a facsimile call, routing said call over special transmission facilities for transmitting facsimile calls.

9. The method of claim 3 wherein said processing step comprises the steps of:
determining that the call destination is not another facsimile station;
translating from the identity of the destination to the identity of an associated facsimile station; and
completing the call to the associated facsimile station.

10. The method of claim 3 further comprising the steps of:
detecting that a destination of said call is busy;
automatically reconnecting said call to a store and forward facility for subsequent delivery.

11. The method of claim 3 further comprising the step of:
following said processing step, responsive to reception of dialed information from a caller of said call, connecting said call to a store and forward facility for storing a facsimile message for subsequent delivery without requiring said caller to reoriginate.

12. The method of claim 3 wherein the recognizing step comprises:
detecting at a local switch that a class of service of a caller of the call is facsimile; and
transmitting an indication that the call is a facsimile call to another switching system for setting the facsimile indicator.

13. The method of claim 12 wherein the indication is carried in information digits from a local exchange carrier to an interexchange carrier.

14. A telecommunications switching system for switchably interconnecting terminals connectable thereto, comprising:
a translation table for storing voice to fax number translations; and
processor means, operative under the control of a program, and responsive to receipt of a call with a fax indicator and a voice destination number, for detecting said fax indicator, and for translating said voice number to a fax number if said fax indicator is detected, and for completing said call to said fax number.

15. A telecommunications switching system for switchably interconnecting terminals connectable thereto, comprising:
a table for storing telephone numbers of facsimile machines originating calls served by said system; and
processor means, operative under the control of a program, for inserting a fax indicator in a common channel signaling (CCS) message being sent to a switching system for calls from one of said telephone numbers of facsimile machines.

16. The system of claim 15 further comprising:
means for receiving said telephone number as an Automatic Number Identification (ANI) number from another switching system.

17. A telecommunications switching system for switchably interconnecting terminals connectable thereto, comprising:
class of service indications of lines connected to facsimile machines; and
processor means, operative under the control of a program, for recognizing said class of service indications and, responsive to said recognition on a call for inserting a fax indicator in a common channel signaling (CCS) message being sent to a switching system for said call.

18. A telecommunications switching system for switchably interconnecting terminals connectable thereto, comprising:
a dual tone multifrequency (DTMF) receiver;
a table for storing telephone numbers of facsimile machines originating calls served by said system; and
processor means, operative under the control of a program, for recognizing a fax call from one of said telephone numbers to another number, for connecting said DTMF receiver to said call, and responsive to signals received by said DTMF receiver, for extending said call to a fax store and forward facility, and for forwarding said one of said telephone numbers and said another number to said fax store and forward facility.

19. A method of setting up a facsimile call comprising the steps of:
recognizing that said call is from a facsimile station;
responsive to said step of recognizing, setting a facsimile indicator in a common channel signaling (CCS) message being sent to a switching system;
processing the call as a facsimile call in the switching system; and
responsive to reception of dialed information from a caller of said call, connecting said call to a store and forward facility for storing a facsimile message for subsequent delivery without requiring said caller to reoriginate;

wherein said step of recognizing comprises the steps of:

receiving an automatic number identification (ANI) number of a calling customer; and translating said ANI number to determine whether a line associated with said ANI number is connected to a facsimile station;

wherein said processing step comprises the steps of:

determining that a call destination for said call is not another facsimile station;

translating from an identity of said destination to an identity of an associated facsimile station; and completing the call to said identified associated facsimile station.

20. A call establishment method for a non-voice call type comprising:

recognizing a non-voice call type at an ingress switching system to a communications network;

transmitting data identifying a voice call destination and data identifying the non-voice call type to an egress switching system of the network said egress system for serving the voice call destination; and translating the combination of the non-voice call type and the voice call destination to determine an alternate destination for the non-voice call type and extending the call from the egress switching system toward the alternate destination.

21. The method of claim 20 wherein the transmitting comprises transmitting an indication identifying the non-voice call type within a common channel signaling message from the ingress switching system to the egress switching system.

22. The method of claim 20 wherein the translating comprises searching a table for an entry, comprising an indication of the alternate destination, the entry identified by the nominal destination and the non-voice call type.

23. The method of claim 20 wherein the recognizing comprises:

receiving an automatic number identification (ANI) number from a switching system connected to the ingress switching system; and testing whether the ANI number is listed as one for a telecommunications station that generates the non-voice call type of call.

24. The method of claim 20 wherein the non-voice call type is a facsimile call.

25. The method of claim 20 wherein the recognizing comprises:

detecting at a local switch that a call is a non-voice type of call; and signaling to said ingress switching system an indication of said non-voice type of call.

26. The method of claim 25 wherein the data identifying the non-voice call type comprises said indication.

27. A method of processing a fax call comprising:

receiving a call from a fax station to a number of other than a fax facility; and in response to said step of receiving, automatically sending each said call to a fax facility;

wherein said receiving comprises:

recognizing at an ingress switch of a communications network for establishing said call that said call is from a fax station;

transmitting a fax signal for said call to an egress switch of said network; and recognizing at said egress switch that said call, having said fax signal, is directed to said number of other than a fax facility.

28. The method of claim 27, wherein said first recognizing comprises:

translating from an identity of said fax station to a fax class of service.

29. The method of claim 28 wherein said identity is a number identified by automatic number identification at a local switching system and transmitted to said ingress switch.

30. The method of claim 27 wherein said transmitting comprises:

transmitting said fax signal as part of a common channel signaling message from said ingress switch to said egress switch.

31. The method of claim 27 wherein said second recognizing comprises:

translating said number to an indication of whether said number is for a fax facility.

32. The method of claim 31 wherein said sending comprises:

translating said number to a number of said fax facility.

* * * * *